United States Patent Office 3,780,065
Patented Dec. 18, 1973

3,780,065
PHENYLVULPINIC ACID DERIVATIVES
Blaine M. Sutton, Hatboro, Pa., assignor to
Smithkline Corporation, Philadelphia, Pa.
No Drawing. Continuation-in-part of abandoned application Ser. No. 188,555, Oct. 13, 1971. This application Aug. 10, 1972, Ser. No. 279,597
Int. Cl. C07d 5/06
U.S. Cl. 260—343.6                     10 Claims

ABSTRACT OF THE DISCLOSURE

Phenylvulpinic acid derivatives having anti-arthritic activity prepared by alcoholysis of the corresponding phenylpulvinic acid dilactone.

---

This application is a continuation-in-part of copending Ser. No. 188,555, filed Oct. 13, 1971, now abandoned.

This invention relates to novel phenylvulpinic acid derivatives having valuable pharmacodynamic activity. More specifically, these compounds possess anti-arthritic activity and at anti-arthritic doses they further produce analgesic and antipyretic activity.

The compounds of this invention are represented by the following general structural formulas:

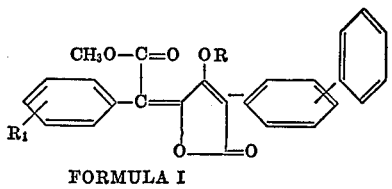

FORMULA I and

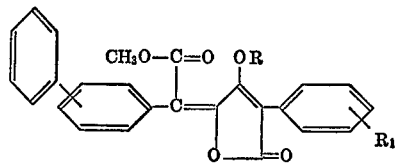

FORMULA II wherein:

R represents hydrogen, acrylyl, methacrylyl, dimethylacrylyl, crotonyl or cinnamoyl; and $R_1$ represents hydrogen, chlorine, bromine, fluorine, lower alkyl of from 1 to 4 carbon atoms, lower alkoxy of from 1 to 4 carbon atoms, dimethoxy, trimethoxy, or trifluoromethyl.

Preferably the compositions of this invention comprise a compound of the above formulas when R is hydrogen and $R_1$ is hydrogen, chlorine, fluorine, lower alkyl or lower alkoxy. Most advantageously R is hydrogen and $R_1$ is hydrogen, chlorine, fluorine, methyl, methoxy, or ethoxy.

The novel phenylvulpinic acid derivatives are prepared according to the following synthetic procedure:

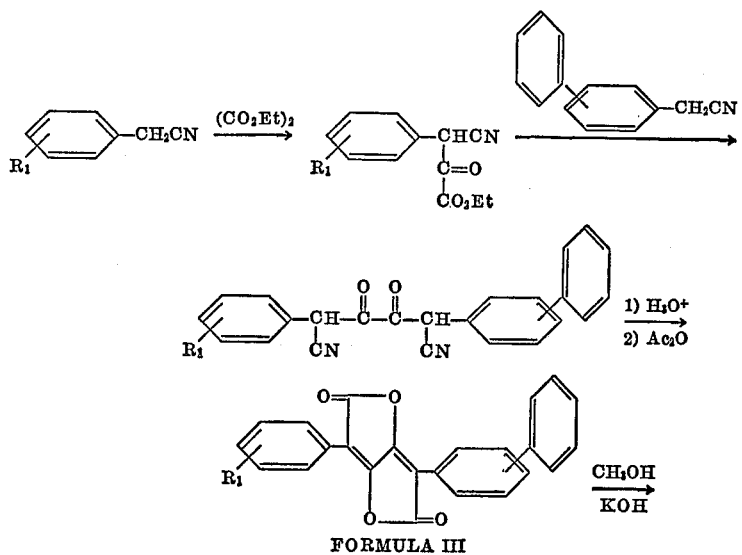

FORMULA III

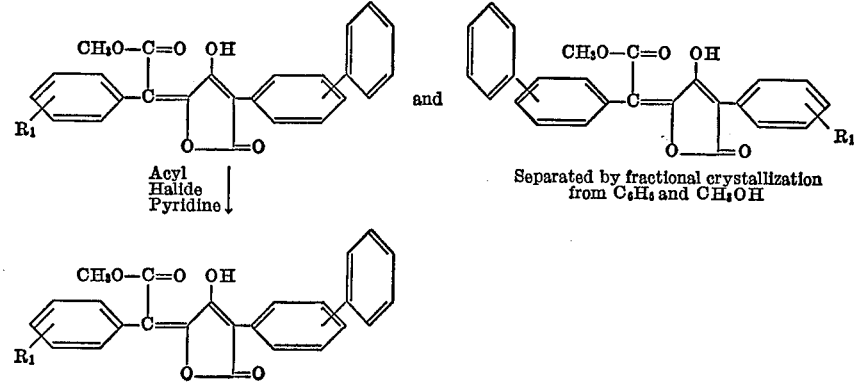

in which R and R₁ are as defined for the above formulas. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a biphenylacetonitrile in an alcoholic solution of an alkali metal lower alkoxide, such as sodium methoxide or ethoxide, to yield the 2-biphenyl-5-phenyl-3,4-dioxoadiponitrile. The above condensations may also be carried out using a metal hydride, such as sodium hydride, in diglyme. The adiponitrile derivative is refluxed for a short period of time, for example one or two hours, in an aqueous acid solution such as water/glacial acetic acid/concentrated sulfuric acid mixture and the resulting pulvinic acid is refluxed with acetic anhydride to furnish the corresponding pulvinic acid lactone of Formula III above. The dilactone ring is opened to the phenylvulpinic acid by treatment with methanol containing an excess of base such as potassium hydroxide. The phenylvulpinic acid derivative is then heated with the appropriate acyl halide, preferably acyl chloride. The reaction is advantageously carried out in a nonreactive organic solvent such as chloroform in the presence of pyridine to yield the desired ester of phenylvulpinic acid.

In the above synthetic sequence, the ring opening of the dilactone of Formula III gives a mixture of positional isomers, namely compounds of Formula I and compounds of the following formula:

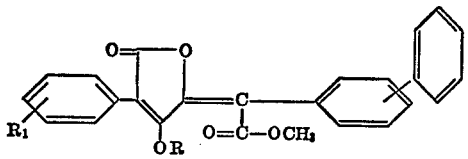

The ratio of isomers obtained is variable. The isomers can be separated by fractional crystallization and/or chromatographic procedures. Their identity is determined from the nuclear magnetic resonance patterns of the aromatic protons. This identification can be confirmed by degradative ozonolysis.

The anti-arthritic activity of the compounds of this invention is measured by their ability to inhibit adjuvant arthritis in rats. The novel compounds of this invention produce marked inhibition of the development of adjuvant arthritis in rats at a daily oral dose of 20–25 mg. per kilogram of body weight. Adjuvant arthritis in rats is produced by a single injection of 0.75 mg. of *Mycobacterium butyricum* suspended in white paraffin (N.F.) into a hindpaw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formulas I and II administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention may be administered orally or parenterally in conventional dosage unit forms such as tablets, capsules, injectables or the like, by incorporating the appropriate dose of a compound of Formulas I and II, with carriers according to accepted pharmaceutical practices. Preferably the compound is administered orally to an animal organism in a tablet or capsule comprising an amount sufficient to produce anti-arthritic activity. Each dosage unit will contain the active medicament in an amount of about 10 mg. to about 50 mg. Advantageously equal doses will be administered 1 to 3 times daily with the daily dosage regimen being about 10 mg. to about 150 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozene. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples are not limiting but are illustrative of compounds of this invention and the procedures for their preparation. Other variations of this invention will be obvious to those skilled in the art.

EXAMPLE 1

A mixture of 117.1 g. of 1.0 m.) of phenylacetonitrile and 326 ml. (2.4 m.) of ethyl oxalate is added to an ethanol solution of sodium ethoxide (prepared by dissolving 23.8 g. 1.08 g. atom of sodium in 500 ml. of absolute ethanol) and refluxed two hours. After cooling, diluting with 2500 ml. of water and extracting with ether, the solution is acidified with acetic acid. The solid is removed and washed with water to give ethyl 3-cyano-3-phenylpyruvate, M.P. 127–129° C.

Ethyl 3-cyano-3-phenylpyruvate 13.0 g. (0.06 m.) is slowly added to a mixture of 11.6 g. (0.06 m.) p-biphenylacetonitrile and 8.44 g. (0.18 m.) of sodium hydride in 40 ml. of diglyme at a temperature below 0° C. The mixture is permitted to warm and several drops of methanol are added to start the reaction. The mixture is allowed to stand at room temperature overnight, cooled and diluted with 150 ml. of water. The mixture is then extracted with ether and the aqueous layer is acidified with acetic acid to give 2-(4'-biphenyl)-5-phenyl-3,4-dioxoadiponitrile as a yellow solid.

A mixture of 16.9 g. of 2-(4'-biphenyl)-5-phenyl-3,4-dioxoadiponitrile in 95 ml. of water, 140 ml. of glacial acetic acid and 70 ml. of concentrated sulfuric acid is refluxed for one hour. The suspension is cooled, poured onto 800 ml. of ice water and the solid removed and washed to give 4'-phenylpulvinic acid.

Phenylpulvinic acid (23.0 g.) is refluxed in 300 ml. of acetic anhydride for 15 minutes. The cooled solution is stirred into 1200 ml. of ice and water and the oily mass crystallized by stirring in 500 ml. of ethanol. The brown solid is removed, washed with ethanol an dried to yield 4-phenylpulvinic acid lactone.

A mixture of 7.1 g. of 4-phenylpulvinic acid lactone, 28 g. of potassium hydroxide in 1200 ml. of methanol is allowed to stand at room temperature for one hour. The brown solution is cooled and acidified with concentrated hydrochloric acid. The solid is filtered, washed with water and dried. The solid is dissolved in methanol and decolorized with charcoal. Concentrating and cooling yields 4'-phenylvulpinic acid as brownish yellow crystals having a melting point of 184.5–185.5° C.

Work up of the methanol filtrate and crystallization from benzene and toluene yielded 4-phenylvulpinic acid having a melting point of 210.5–215° C.

In like manner using the above procedure and employing 19.3 g. (0.1 m.) of m-biphenylacetonitrile as a starting material yields 3-phenylpulvinic acid lactone. The lactone (6.0 g.) is reacted with methanol and potassium hydroxide to obtain a mixture of 3'-phenylvulpinic acid and 3-phenylvulpinic acid. The isomers (6.5 g.) are then crystallized from methanol and benzene to first yield 3'-phenylvulpinic acid as yellow crystals having a melting point of 146° C. Evaporation of the solvent and further crystallization from methanol and benzene yielded 3-phenylvulpinic acid having a melting point of 175–176° C.

EXAMPLE 2

Acrylyl chloride, 5 ml., is added to a solution of 3.9 g. (.01 m.) 4-phenylvulpinic acid (as prepared in Example 1) in 25 ml. of chloroform containing 1 ml. of pyridine and refluxed for five minutes. The reaction mixture is then concentrated, washed and recrystallized to yield acrylyl 4-phenylvulpinic acid.

EXAMPLE 3

Methacrylyl chloride, 10 ml., is added to a solution of 6.4 g. of phenylvulpinic acid (as prepared in Example 1) in 50 ml. of chloroform containing 4 ml. of pyridine and refluxed for five minutes. The reaction mixture is then concentrated, washed, and recrystallized to yield methacrylyl 4-phenylvulpinic acid.

EXAMPLE 4

Dimethylacrylyl chloride, 5 ml., is distilled from 7.5 g. of dimethylacrylic acid and 21.1 g. of benzoyl chloride and added to a solution of 3.9 g. of phenylvulpinic acid (as prepared in Example 1) in 25 ml. of chlorofrom containing 2 ml. of pyridine. The reaction mixture is then concentrated, washed and recrystallized to yield dimethylacrylyl 4-phenylvulpinic acid.

EXAMPLE 5

A solution of 15 ml. of crotonyl chloride, 9.2 g. of phenylvulpinic acid, 6 ml. of pyridine and 75 ml. of chloroform is refluxed for ten minutes. The reaction mixture is then concentrated, washed and recrystallized to yield crotonyl-4-phenylsulpinic acid.

EXAMPLE 6

Similarly by employing p-chlorophenylacetonitrile in the initial reaction described in Example 1 to obtain 3-cyano-3-(p-chlorophenyl)-pyruvate followed by reaction with biphenylacetonitrile and the subsequent synthetic steps, there is prepared the product 4-chloro-4'-phenylvulpinic acid.

EXAMPLE 7

Following the procedures outlined in Example 1, m-methoxyphenylacetonitrile is reacted with diethyl oxalate in alcoholic sodium ethoxide solution to give ethyl 3-cyano-3-(m-methoxyphenyl)-pyruvate which is then similarly reacted with biphenylacetonitrile and the subsequent synthetic steps to yield 3-methoxy-4'-phenylvulpinic acid.

EXAMPLE 8

By employing the procedures set forth in Example 1, α-fluorophenylacetonitrile is reacted with diethyl oxalate in alcoholic sodium ethoxide to give ethyl 3-cyano-3-(o-fluorophenyl)-pyruvate. Reaction of the latter with biphenylacetonitrile and the subsequent synthetic steps of Example 1 yields 2-fluoro-4'-phenylvulpinic acid.

Similarly, by utilizing m-trifluoromethylphenyl acetonitrile as the initial reactant as described above, there is ultimately produced 3-trifluoromethyl-4'-phenylvulpinic acid.

EXAMPLE 9

Similarly following the procedure of Example 1, 3,4,5-trimethoxyphenylacetonitrile is substituted as a starting material for phenylacetonitrile and yields 3,4,5-trimethoxy-4'-phenylvulpinic acid.

EXAMPLE 10

A solution containing 16.6 g. of cinnamoyl chloride, 4.0 g. of phenylvulpinic acid (as prepared in Example 1) and 25 ml. of chloroform containing 1 ml. of pyridine is refluxed for five minutes. The reaction mixture is concentrated, washed and recrystallized to yield cinnamoylphenylvulpinic acid.

EXAMPLE 11

Acrylyl chloride, 5 ml. is added to a solution of 4.3 g. of 4-chloro-4'-phenylvulpinic acid (as prepared in Example 6) in 30 ml. of chloroform containing 1 ml. of pyridine and refluxed for five minutes. The reaction mixture is then concentrated, washed and recrystallized to yield acrylyl 4-chloro-4'-phenylvulpinic acid.

EXAMPLE 12

| Ingredients: | Mg./tablet |
| --- | --- |
| 4-phenylvulphinic acid | 10 |
| Calcium sulfate, dihydrate | 150 |
| Sucrose | 25 |
| Starch | 15 |
| Talc | 5 |
| Stearic acid | 3 |

The sucrose, calcium sulfate and phenylvulpinic acid are thorouhgly mixed and granulated with hot 10% gelatin solution. The wetted mass is passed through a #6 mesh screen directly onto drying trays. The granules are dried at 120° C. and passed through a #20 mesh screen, mixed with the starch, talc and stearic acid, and compressed into tablets.

EXAMPLE 13

| Ingredients: | Mg./capsule |
| --- | --- |
| Acrylyl-4-phenylvulpinic acid | 50 |
| Magnesium stearate | 5 |
| Lactose | 350 |

The above ingredients are screened through a #40 mesh screen, mixed and filled into #0 hard gelatin capsules.

EXAMPLE 14

By following the procedures outlined in Example 1 and employing p-ethoxyphenylacetonitrile in the initial reaction to obtain ethyl 3-cyano-3-(p-ethoxyphenyl)-pyruvate followed by reaction with p-biphenylacetonitrile and the subsequent synthetic steps, there is prepared 4-ethoxy-4'-phenylvulpinic acid.

What is claimed is:

1. A chemical compound selected from the formulas:

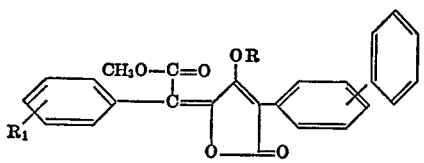

and

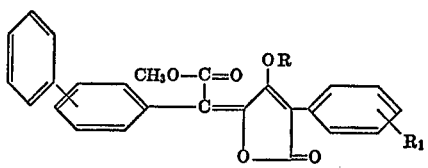

wherein:

R is hydrogen, acrylyl, methacrylyl, dimethylacrylyl, crotonyl or cinnamoyl; and $R_1$ is hydrogen, chlorine, bromine, fluorine, lower alkyl of from 1 to 4 carbon atoms, lower alkoxy of from 1 to 4 carbon atoms, dimethoxy, trimethoxy, or trifluoromethyl.

2. A chemical compound according to claim 1 in which R is hydrogen.

3. A chemical compound according to claim 2 in which $R_1$ is hydrogen.
4. A chemical compound according to claim 1 in which R is acrylyl.
5. A chemical compound according to claim 1 in which R is methacrylyl.
6. A chemical compound according to claim 2 in which $R_1$ is chlorine.
7. A chemical compound according to claim 2 in which $R_1$ is methyl.
8. A chemical compound according to claim 2 in which $R_1$ is methoxy.
9. A chemical compound according to claim 4 in which $R_1$ is hydrogen.
10. A chemical compound according to claim 1 in which $R_1$ is ethoxy.

References Cited
UNITED STATES PATENTS
3,676,464   7/1972   Foden et al. _____ 260—343.3

ALEX MAZEL, Primary Examiner
A. M. TIGHE, Assistant Examiner

U.S. Cl. X.R.
260—465 R, 465 F, 465 G, 465 D, 465 H, 240 J; 424—279